US010644788B2

(12) United States Patent
Gayrard

(10) Patent No.: US 10,644,788 B2
(45) Date of Patent: May 5, 2020

(54) METHOD OF ALLOCATING FREQUENCY RESOURCES FOR A SATELLITE TELECOMMUNICATION SYSTEM

(71) Applicant: THALES, Courbevoie (FR)

(72) Inventor: Jean-Didier Gayrard, Toulouse (FR)

(73) Assignee: THALES, Courbevoie (FR)

(*) Notice: Subject to any disclaimer, the term of this patent is extended or adjusted under 35 U.S.C. 154(b) by 123 days.

(21) Appl. No.: 16/137,956

(22) Filed: Sep. 21, 2018

(65) Prior Publication Data

US 2019/0097717 A1    Mar. 28, 2019

(30) Foreign Application Priority Data

Sep. 26, 2017 (FR) .................... 17 00986

(51) Int. Cl.
*H04B 7/185* (2006.01)
*H04B 17/336* (2015.01)
*H04B 7/08* (2006.01)

(52) U.S. Cl.
CPC ....... *H04B 7/18513* (2013.01); *H04B 7/0857* (2013.01); *H04B 7/18515* (2013.01); *H04B 7/18517* (2013.01); *H04B 7/18539* (2013.01); *H04B 7/18582* (2013.01); *H04B 17/336* (2015.01)

(58) Field of Classification Search
None
See application file for complete search history.

(56) References Cited

U.S. PATENT DOCUMENTS

| 8,634,296 B2 | 1/2014 | Agarwal |
| 2003/0073435 A1 | 4/2003 | Thompson et al. |
| 2003/0203737 A1 | 10/2003 | Jarett |
| 2016/0191145 A1 | 6/2016 | Fang et al. |

*Primary Examiner* — James P Duffy
(74) *Attorney, Agent, or Firm* — Baker & Hostetler LLP

(57) ABSTRACT

A method is provided for dynamically allocating the radio resources of a satellite and a very high throughput satellite system configured to implement this method. The method of allocation is executed by a piece of ground equipment called a Radio Resource Manager. The method of allocation according to the invention, allocates dynamically in time frequency resources to each spot of the multibeam coverage in accord with the conditions of propagation of the radio signals (in particular the attenuations due to bad weather) prevailing in the spots, with the current and future spot data traffic profile, with the level of interference generated in the neighbouring beams. The method preferentially applies in respect of downgoing forward links, that is to say from the satellite to the user terminals.

12 Claims, 15 Drawing Sheets

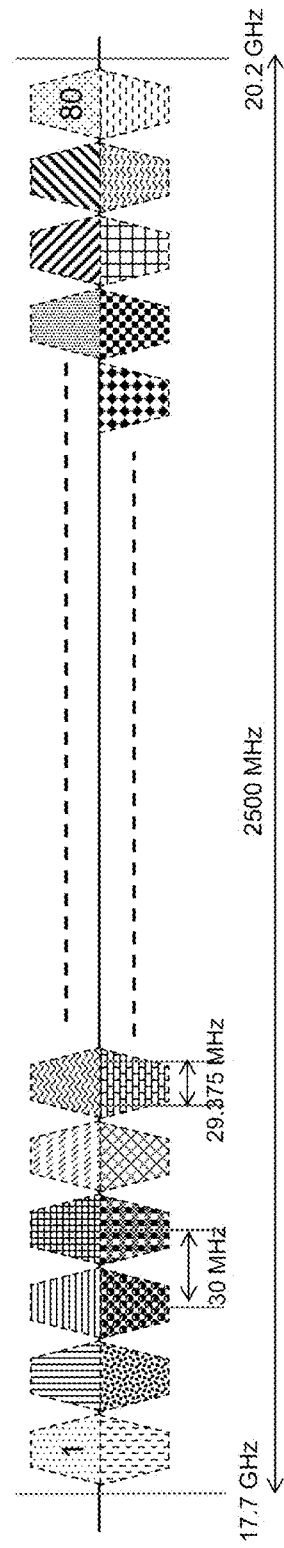
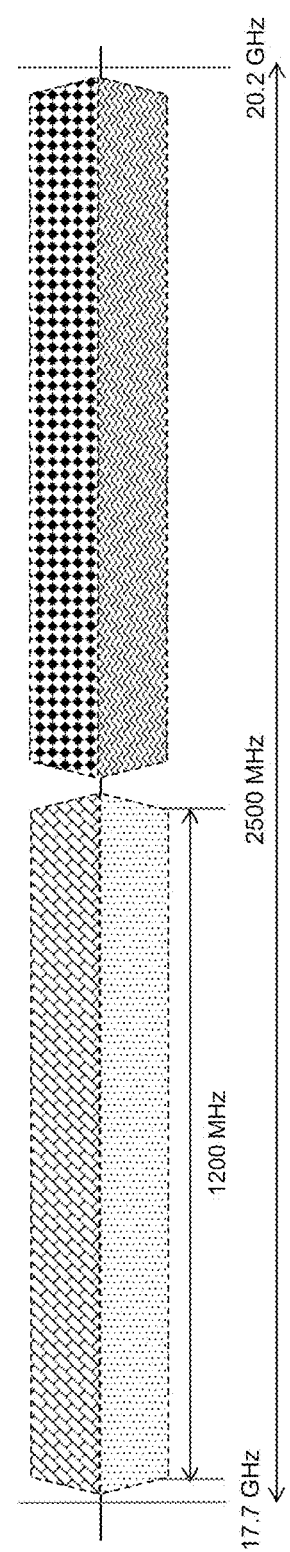
FIG.2bis    FIG.2

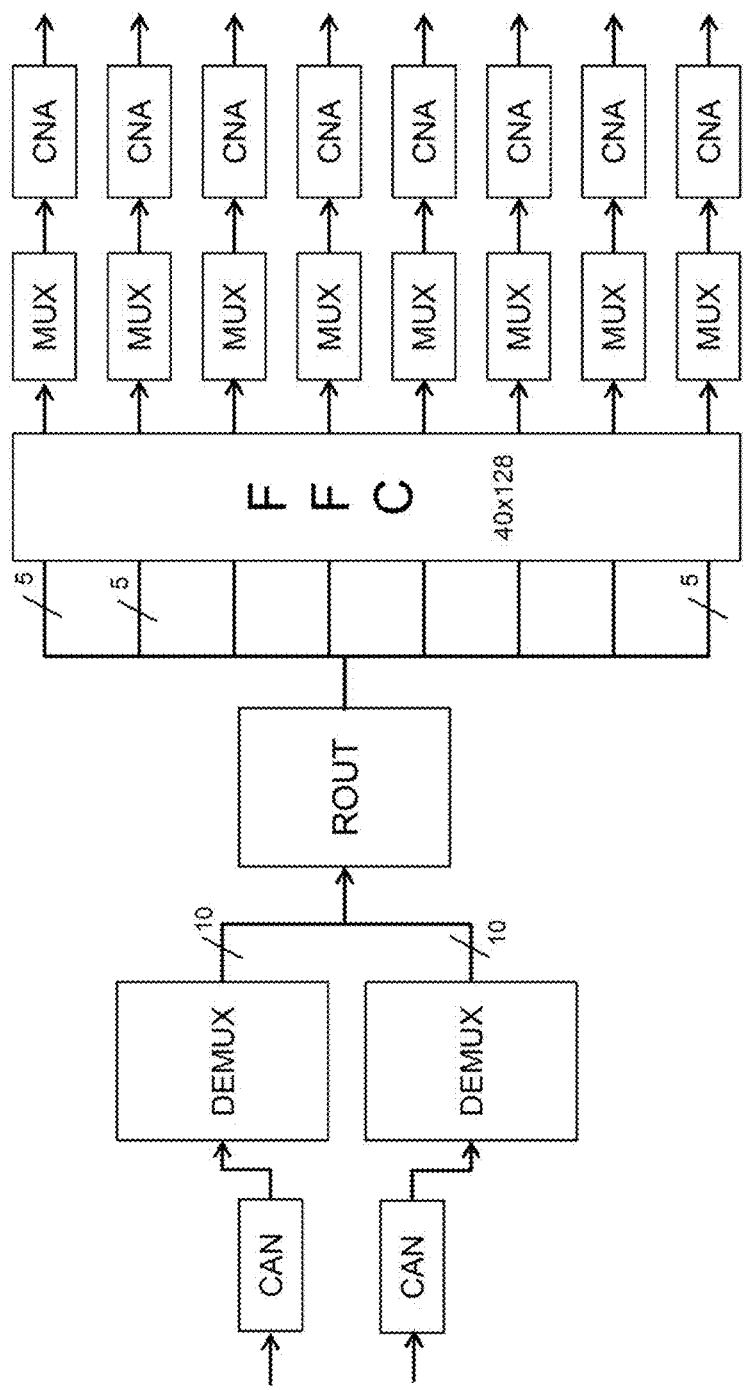
FIG.6bis

| Spot | Terminal | Channel 1 | Channel 2 | Channel 3 | Channel 4 | Channel 5 |
|---|---|---|---|---|---|---|
| Spot 1 | U1 | X | | | | |
| | U2 | X | | | | |
| Spot 2 | U3 | | X | | | |
| | U7 | | | | X | |
| | U10 | | | | | X |
| Spot 3 | U4 | | X | | | |
| | U8 | | | | X | |
| Spot 4 | U5 | | X | | | |
| | U6 | | | X | | |
| | U9 | | | | X | |
| | U11 | | | | | |
| | U12 | | | | | X |

FIG.13

METHOD OF ALLOCATING FREQUENCY RESOURCES FOR A SATELLITE TELECOMMUNICATION SYSTEM

CROSS-REFERENCE TO RELATED APPLICATIONS

This application claims priority to foreign French patent application No. FR 1700986, filed on Sep. 26, 2017, the disclosure of which is incorporated by reference in its entirety.

FIELD OF THE INVENTION

The invention relates to the field of very high throughput satellite systems or communication systems based on very broadband Internet access by geostationary satellite, and also called VHTS (for "Very High Throughput Satellite") systems. The invention relates more precisely to satellites comprising several antennas in order to produce multibeam coverage.

The invention pertains to a method of allocating frequency resources to various user terminals present in the satellite's multibeam coverage zone. The proposed method of allocating resources is dynamic in time and frequency and affords flexibility in the allocation of resources to each spot of the coverage according to the conditions of propagation of the radio signals in the spot, according to the satellite antenna system's inter-beam isolation performance and according to the nature and the volume of the current and forthcoming data traffic in the spot. The invention is useful in very high throughput satellite systems with multi-beam coverage operating in particular in the Ka band (20/30 GHz).

BACKGROUND

In very high throughput satellite systems with multibeam coverage and with frequency reuse between beams, the allocation of the resources in terms of frequency and radio power is generally fixed by design of the satellite's payload. Typically, in a very high throughput satellite system operating in the Ka band (20/30 GHz), to each beam of the coverage is allocated a fixed radiofrequency power (RF) corresponding to the output power of the amplifier connected to the beam, and a fixed frequency band corresponding to a colour of the frequency reuse scheme. In a multibeam system with reuse of frequencies, the bandwidth allocated to the mission, typically the Ka band from 17.3 GHz to 20.2 GHz, is split up into sub-bands of frequencies or colours. A colour is allocated to each spot of the coverage according to a scheme which makes it possible to minimize the inter-beam interference. For example, in a system operating in the Ka band (20/30 GHz) according to a frequency reuse scheme with four colours and two polarizations, to each spot of the coverage is allocated in a fixed manner a frequency band of 1.4 GHz of bandwidth and an RF power transmitted by a travelling-wave amplifier of some hundred watts. In order to minimize the antenna's inter-beam interference, it is customary to generate identical beams in terms of radiation pattern, leading to spots of equal size throughout the coverage.

Very high throughput satellite systems with fixed allocation of resources have a first drawback in the case of a non-regular geographical distribution of data traffic. Thus in the spots with light data traffic, such as for example rural zones with low user density, part of the frequency and power resources allocated to these spots is not used to serve the light data traffic. Being unable to be allocated to another spot, these resources are wasted. In the spots with heavy data traffic demand, such as for example urban zones with a very high density of users, the frequency and power resources allocated to these spots are not sufficient to serve the data traffic required. Being unable to use the resources allocated to another spot, part of the data traffic will not be served.

Very high throughput satellite systems with fixed allocation of resources have a second drawback in the case of a temporal variation of the data traffic in a spot. This variation may be daily (peak periods), seasonal or during the lifetime of the satellite. Thus at certain moments the data traffic demand is low, part of the allocated frequency and power resources is not used to serve the light data traffic. At other moments, the data traffic demand is very high and the frequency and power resources allocated are not sufficient to serve the peak data traffic.

Thus, very high throughput satellite systems with fixed allocation of resources are not suitable for serving data traffic profiles that vary in space (geographical distribution) and over time (seasonal or daily variations).

Very high throughput satellite systems with fixed allocation of resources have a third drawback. The radiofrequency links in the ka band (20/30 GHz) between the satellite and the user terminals are very sensitive to the phenomena of attenuation and fading of the radio signals due in particular to bad weather (rain, snow, hail, etc.). To maintain the links in case of bad weather, it is customary in very high throughput satellite systems to reduce the data throughput of the disturbed links. This technique is implemented by the introduction of adaptive modulation and adaptive coding or ACM for "Adaptive Coding and Modulation". Consequently, the data traffic in a spot undergoing bad weather is reduced; it is not possible in these very high throughput satellite systems with fixed resource allocation, to allocate to the spots affected by bad weather more resources in terms of frequency and power in order to counter the attenuations and fadings.

This misfit between the resources in terms of frequency and power and the data traffic variations penalizes the profitability of these very high throughput satellite systems.

An exemplary method, described in American patent U.S. Pat. No. 8,634,296, of frequency allocation for multibeam satellite systems is in particular known. This method takes no account of the phenomena of attenuation of the signal in each spot of the coverage zone or of the interference between adjacent beams and channels.

The invention proposes a method of dynamically allocating the radio resources of a satellite and a very high throughput satellite system configured to implement this method. The method of allocation is executed by a piece of ground equipment called a Radio Resource Manager or RRM. The method of allocation according to the invention, allocates frequency resources dynamically over time to each spot of the multibeam coverage in accord with the conditions of propagation of the radio signals (in particular the attenuations due to bad weather) prevailing in the spots, with the current and future spot data traffic profile, with the level of interferences generated in the neighbouring beams. The method applies preferentially in respect of downgoing forward links, that is to say from the satellite to the user terminals.

In contradistinction to the very high throughput satellite systems according to the prior art in which the frequency plan or frequency reuse scheme typically comprises at most four colours, the frequency plan or the frequency reuse scheme of the method according to the invention comprises tens of colours. For example, the frequency plan of a very high throughput satellite system according to the invention, operating in the Ka band (17.7 GHz to 20.2 GHz), comprises 80 colours of 30 MHz of bandwidth in each polarization. In each polarization, the colours are numbered from 1 to 80. Each spot can be allocated from zero (no traffic in the spot) to 80 frequency sub-bands or colours (maximum traffic in the spot).

A resources allocation configuration is, for each spot of the coverage, the total number and the index numbers of colours allocated to this spot and the radio power allocated to this spot.

The time is split up into time intervals of fixed duration called time slice or slot. To each time slot there corresponds a different resources allocation configuration. During each time slot, the Radio Resource Manager establishes the resources allocation configuration of the next time slot. The resources allocation configuration is established by the method of dynamically allocating radio resources according to the invention.

SUMMARY OF THE INVENTION

The method of allocation according to the invention is based on utilizing three sets of information to compute the resource allocation configuration to be applied to the next time slot:

a map of the traffic or the list of data traffic demands of the next time slot. This is the list of active terminals with, for each, its geographical position including the identification of the spot, its data traffic demand, its telecommunication performance and all other relevant information for establishing the terminal's service demand in the next time slot.

a map of the isolations representing the gain performance of each beam of the antenna for each point of the coverage and preferentially taking into account conditions of squinting of the satellite antenna.

a map of the attenuations. This is the list of active terminals with, for each, an estimation of the local propagation conditions, typically the attenuation undergone by the radio signal coming from the satellite and received by the terminal. This estimation of the local propagation conditions is either computed regularly on the basis of data or of meteorological forecasts of local precipitations and cloudiness, or extrapolated on the basis of measurements of the quality of the radio link (typically the signal-to-noise ratio or the modulation and the coding which are selected by the ACM device), made by the active terminal in the preceding time slot.

The computation of the resource allocation configuration consists in defining the resources allocation configuration which maximizes the data traffic and which complies with the set of constraints related to the data traffic demand, to the propagation conditions and to the interference levels.

The subject of the invention is a method of allocating frequency channels, from among a list of channels, to a plurality of terminals in a multi-beam satellite telecommunications system comprising a satellite and at least one feeder station, the satellite comprising at least one amplifier and at least one antenna, the method comprising the steps of:

establishing a list of active terminals and, for each terminal, determining a first signal-to-noise ratio $SNR_n$ for the link between a feeder station and the terminal via the satellite, at least on the basis of an estimate of the attenuation undergone by the signal as a function of the signal propagation conditions, removing the terminal from the list of active terminals if the first signal-to-noise ratio is less than a predetermined threshold, computing the necessary radiofrequency power of the amplifier associated with the beam illuminating the terminal to achieve the said first signal-to-noise ratio, removing the terminal from the list of active terminals if the sum of the necessary radiofrequency powers of all the amplifiers of the satellite exceeds a maximum power capacity threshold, for each channel selected from the list of frequency channels,
  i. Computing a signal-to-interference ratio $SIR_c$ for the said terminal in the selected channel,
  ii. If the sum of the first signal-to-noise ratio $SNR_n$ and of the signal-to-interference ratio $SIR_c$ is less than the said predetermined threshold, allocating the selected channel to the said terminal,
  iii. Otherwise, selecting another channel.

According to a particular aspect of the invention, the first signal-to-noise ratio $SNR_n$ is determined on the basis of a signal-to-noise plus interference ratio $SNIR_s$ on a feeder link between a feeder station and the satellite and of a second signal-to-noise ratio $SNR_d$ for the downlink between the satellite and the terminal.

According to a particular aspect of the invention, the second signal-to-noise ratio $SNR_d$ is determined at least on the basis of the equivalent isotropic radiated power $EIRP_u$ emitted by an antenna of the satellite in the direction of the said terminal, of an estimate of the attenuation $A_u$ undergone by the signal as a function of the signal propagation conditions.

According to a particular aspect of the invention, the necessary radiofrequency power of the amplifier associated with the beam illuminating the terminal is determined at least on the basis of a gain of the antenna of the satellite generating the said beam in the direction of the terminal.

According to a particular variant of the invention, the beams generated by the satellite are fixed and the gains of the antennas of the satellite are precomputed and stored in a database.

According to another particular variant of the invention, the beams generated by the satellite are reconfigurable and the gains of the antennas of the satellite are determined by a module for computing antenna radiation patterns.

According to a particular aspect of the invention, the necessary radiofrequency powers of all the amplifiers of the satellite are computed for each terminal to which a frequency channel has been allocated.

According to a particular aspect of the invention, the predetermined threshold is a signal-to-noise ratio required to ensure a given quality-of-service level.

According to a particular aspect of the invention, the signal propagation conditions are determined on the basis of meteorological data.

According to a particular aspect of the invention, the steps of the method are iterated while varying at each iteration a time slot allocated to the terminals in order to communicate.

The subject of the invention is also a radio resources manager configured to implement the method of allocating frequency channels according to the invention and a satellite telecommunications system comprising a multi-beam satellite, at least one feeder station to establish a communication link between a network and a plurality of terminals, via the satellite, and a radio resources manager according to the invention.

BRIEF DESCRIPTION OF THE DRAWINGS

Other characteristics and advantages of the present invention will become better apparent on reading the description which follows in relation to the appended drawings which represent:

FIG. 2, an example of frequency plan of a very high throughput satellite system according to the prior art, FIG. 2*bis*, an example of frequency plan of a very high throughput satellite system according to the invention, FIG. 3, a diagram of an exemplary payload of a very high throughput satellite able to implement the method of allocating resources according to the invention, FIG. 4, a diagram of an exemplary forward repeater of the payload of a very high throughput satellite able to implement the method of allocating resources according to the invention, FIG. 5, a basic diagram illustrating the manner of operation of a digital transparent processor included in the forward repeater of the payload of a very high throughput satellite able to implement the method of allocating resources according to the invention, FIG. 6, a diagram of a first exemplary architecture of a digital transparent processor.

DETAILED DESCRIPTION

Figure 1:
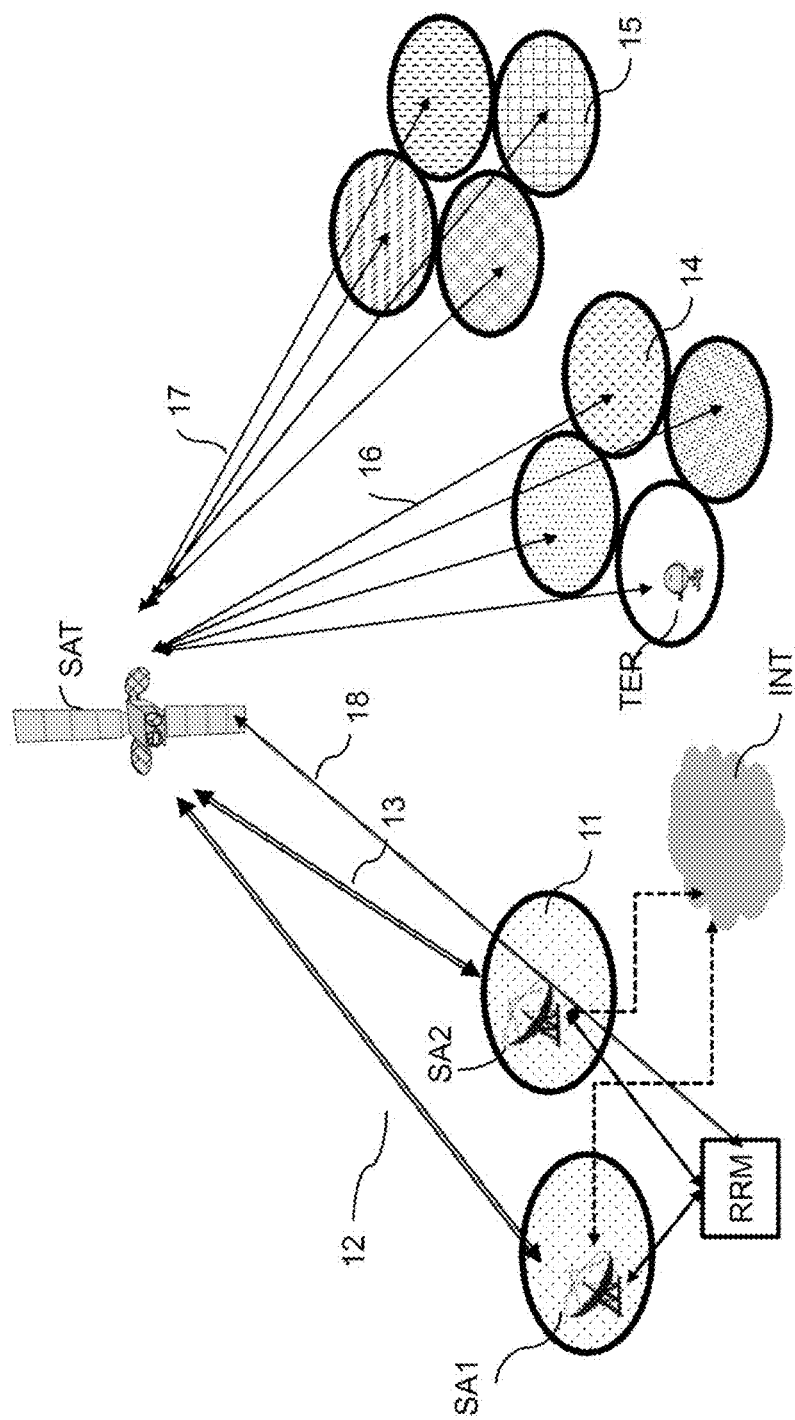
FIG. 1, a diagram of a multibeam satellite telecommunication system.

FIG. 1 represents a multibeam satellite broadband telecommunications system for access to the Internet network INT. Such a system comprises a satellite SAT, at least one feeder station SA1,SA2 also called a "gateway" and several user terminals TER situated in various cells or spots 14,15. The system furthermore comprises a radio resources manager RRM able to communicate on the one hand with the feeder stations SA1,SA2 and on the other hand with the satellite SAT, via for example a remote control link 18.

A feeder station SA1,SA2 comprises a radiofrequency emission and reception device to communicate with the user terminals TER via the satellite SAT through the bidirectional links 12,13,16,17. A link from a feeder station SA1 to the user terminals TER via the satellite SAT is called a forward link. A link from a user terminal TER to the feeder stations SA1,SA2 via the satellite SAT is called a return link. The links 12,13 between a feeder station SA1,SA2 and the satellite SAT are called feeder or contribution links. The feeder links 12,13 are bidirectional and consist of forward links in an upgoing direction from a feeder station SA1,SA2 to the satellite SAT and of return links in a downgoing direction from the satellite SAT to a feeder station SA1,SA2. The links 16,17 between the set of user terminals TER and the satellite SAT are called user links. The user links 16,17 are bidirectional and consist of return links in the upgoing direction from the users TER to the satellite SAT and of forward links in the downgoing direction from the satellite SAT to the users TER. The feeder stations SA1,SA2 are linked to the piece of equipment RRM containing the satellite's radio resources manager. The feeder stations SA1, SA2 are linked to the terrestrial telecommunications networks INT such as the Internet.

In the example of FIG. 1, there are two feeder stations SA1,SA2 and 8 beams illuminating 8 user cells 14,15.

In a telecommunication system such as described in FIG. 1, the user terminals TER share the frequency band (for example the Ka band from 17.3 to 20.2 GHz) between themselves in order to communicate.

FIG. 2 represents an example of frequency plan for the user links according to a method of allocation of the prior art. Typically, such a frequency plan comprises at most two channels in two different polarizations i.e. four different colours.

FIG. 2*bis* represents an example of frequency plan for the user links according to the method of allocation proposed by the invention. Such a frequency plan comprises several tens of channels, for example 80 channels, each of 30 MHz of bandwidth and in two different polarizations. In each polarization, the channels are numbered from 1 to 80. Each spot can be allocated from zero (no traffic in the spot) to 80 frequency sub-bands or colours (maximum traffic in the spot).

Figure 3:
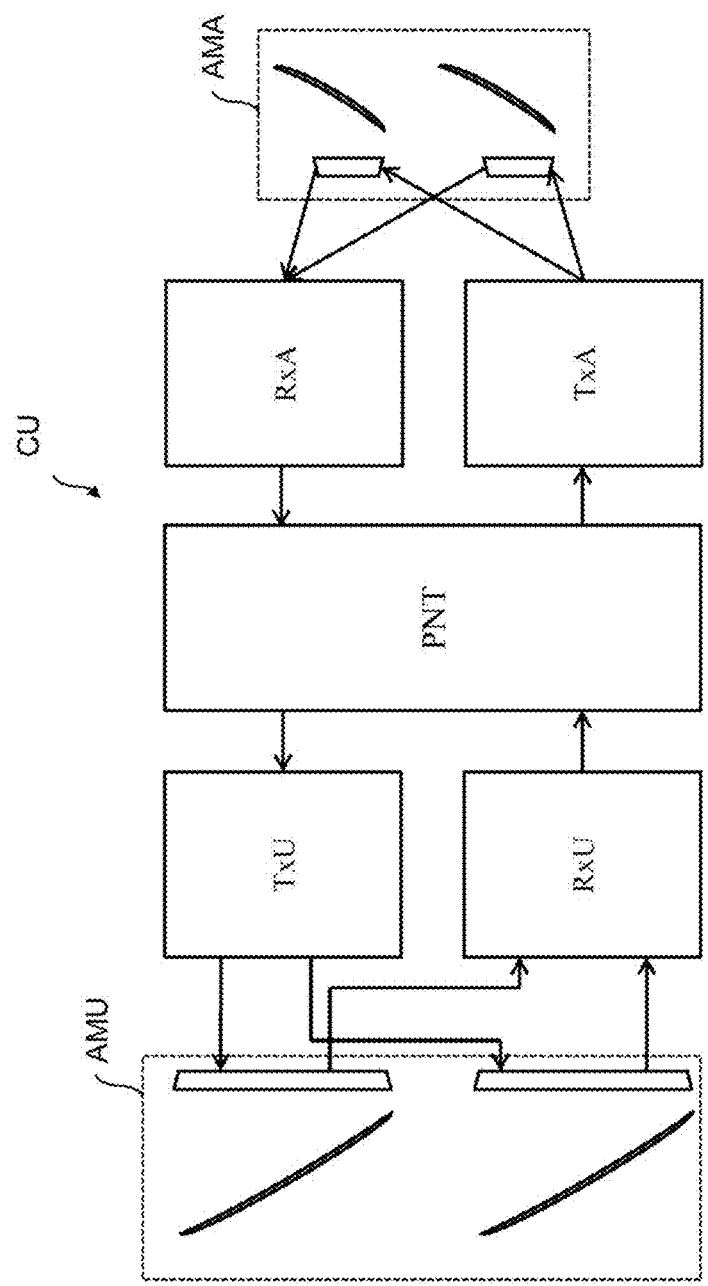

FIG. 3 represents an exemplary payload CU of a broadband satellite SAT of a telecommunication system according to the invention. Such a payload CU comprises a first system of transmit and receive antennas AMU able to generate a plurality of beams to illuminate a plurality of user cells or spots 14,15. The beams can be fixed or dynamic. The payload also comprises a second system of antennas AMA able to generate a plurality of beams to illuminate a plurality of cells 11 each containing a feeder station SA2. The systems of antennas AMU,AMA comprise, for example, an antenna for each beam to be generated. The payload CU also comprises a receive chain RxU to amplify and frequency transpose the radio signals received by the first system of antennas AMU. The payload CU also comprises a transmit chain TxU to frequency transpose and power amplify the radio signals intended to be transmitted by the first system of antennas AMU to the user terminals. The payload CU also comprises a digital transparent processor PNT, a receive chain RxA to amplify and frequency transpose the radio signals received by the second system of antennas AMA, a transmit chain TxA to frequency transpose and power amplify the radio signals intended to be transmitted by the second system of antennas AMA to the feeder stations SA1,SA2. In a particular embodiment, the first system of transmit and receive antennas AMU comprises one or more active antennas.

The systems of antennas AMA,AMU, the receive chain RxA, the processor PNT and the transmission chain TxU constitute a forward repeater. The systems of antennas AMA,AMU, the receive chain RxU, the processor PNT and the transmission chain TxA constitute a return repeater.

Figure 4:
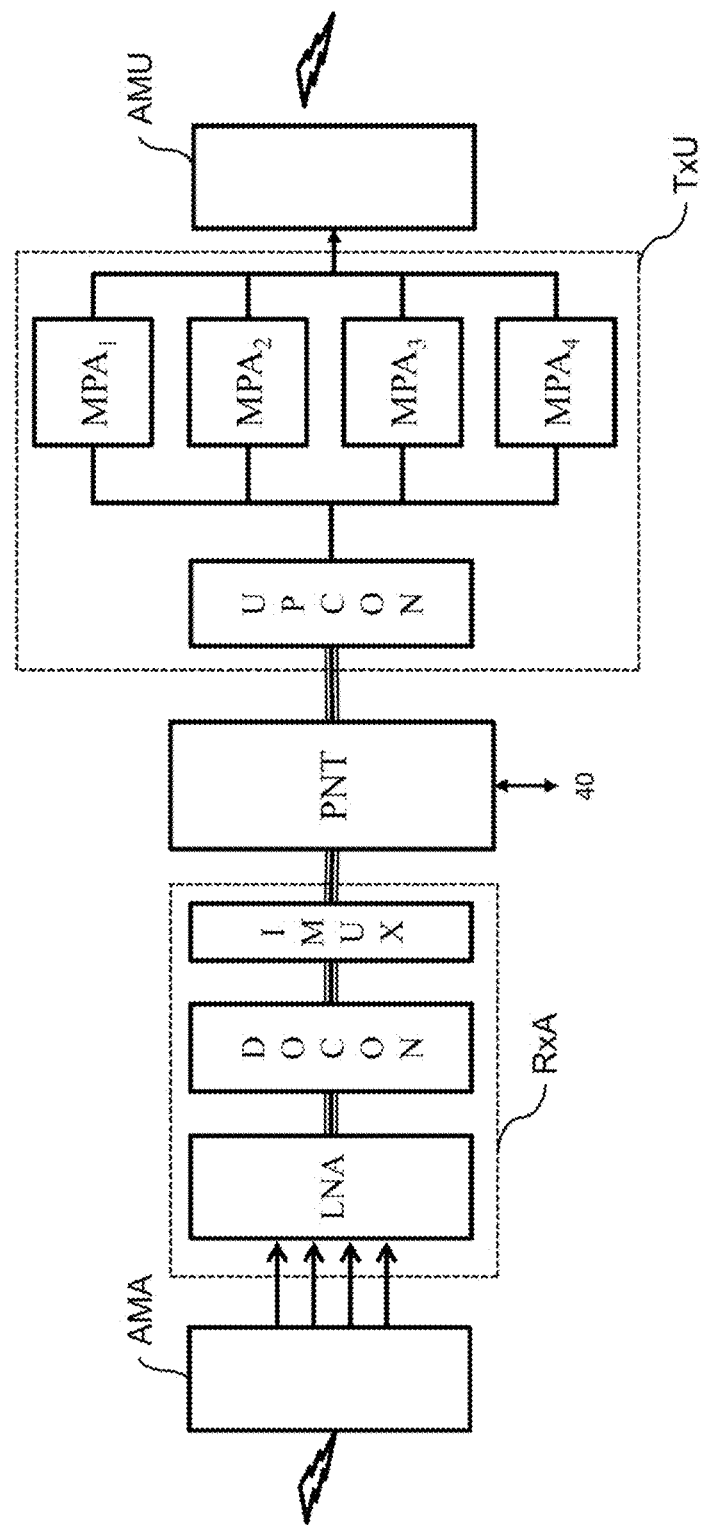

FIG. 4 represents an exemplary forward repeater of a payload CU of a satellite SAT. The elements already described in FIG. 3 have the same references in FIG. 4.

Such a repeater comprises a receive chain RxA which comprises for example one or more low noise amplifiers LNA, one or more frequency down-converters DOCON and one or more broadband demultiplexer filters IMUX. The repeater also comprises a transmit chain TxU which comprises for example one or more frequency up-converters UPCON and one or more multiport amplifiers $MPA_1$, $MPA_2$, $MPA_3$, $MPA_4$. Each output of the multiport amplifiers $MPA_1$, $MPA_2$, $MPA_3$, $MPA_4$ is connected to a radiating element of an antenna of the first system of antennas AMU. Beamforming is carried out in the digital transparent processor PNT.

Figure 5:
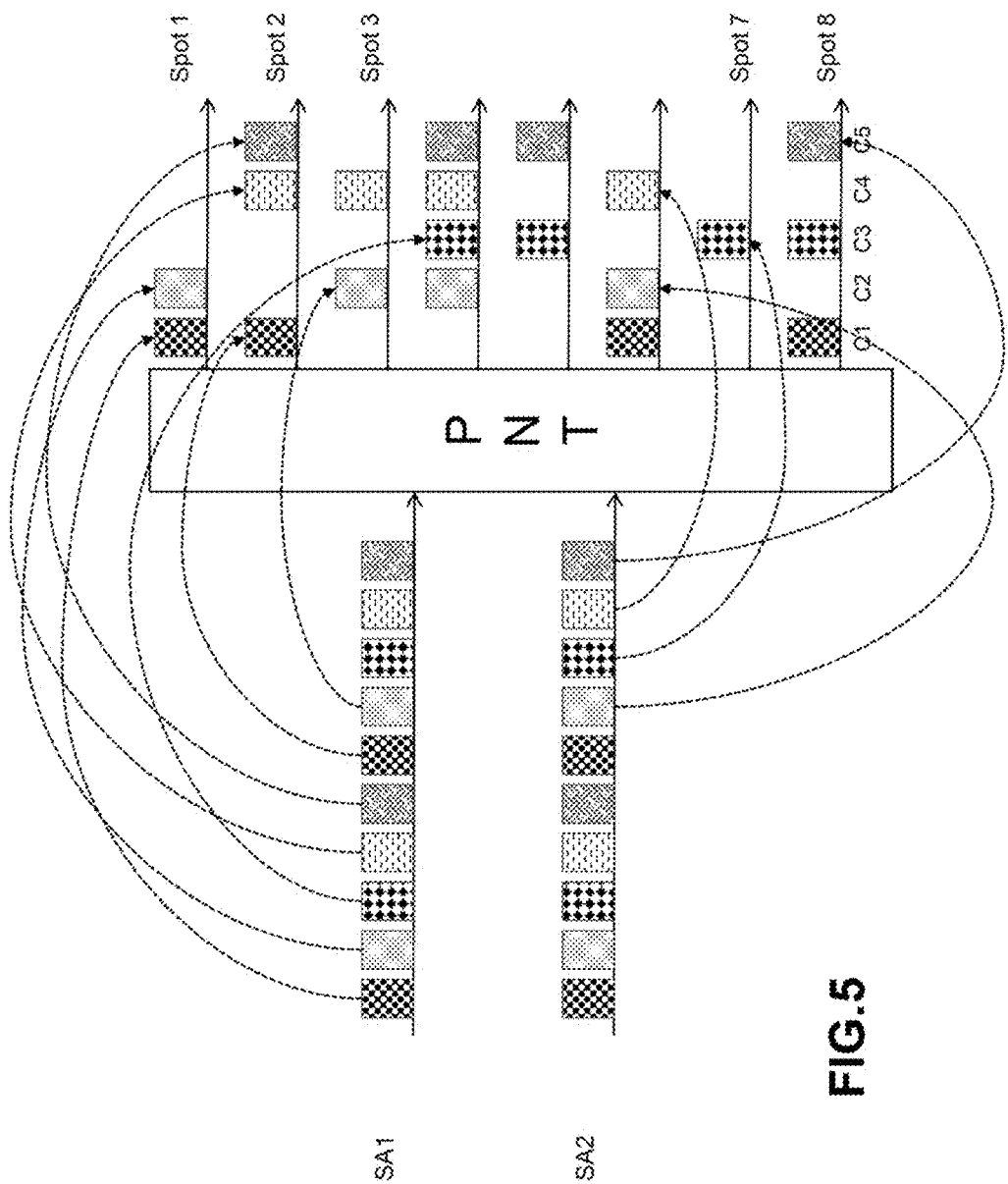

FIG. 5 illustrates the manner of operation of a digital transparent processor included in the forward repeater of the payload of a very high throughput satellite able to implement the method of allocating resources according to the invention.

According to the example of FIG. 5, the forward repeater receives the signals of two feeder stations SA1,SA2 and delivers signals as output to eight user cells or spots, such as is shown diagrammatically in FIG. 1. The frequency plan of the forward user link consists of five frequency bands or colours C1,C2,C3,C4,C5. The frequency plan of the feeder link consists of 10 frequency sub-bands each having a bandwidth equal to the bandwidth of a colour. In this example, the digital transparent processor PNT has two inputs, each corresponding to a feeder station, and eight outputs, each corresponding to a user cell. The signal on each input of the processor PNT consists of a frequency multiplex of at least 10 sub-bands or colours. The signal on each output of the processor PNT consists of a frequency multiplex of at most five colours. The processor PNT comprises at least one digital filter programmable in terms of central frequency and bandwidth at input and able to select or demultiplex the sub-bands present on the inputs of the processor. The processor PNT also comprises a switch or a router able to route a sub-band from an input of the processor to an output of the processor and at least one digital filter programmable in terms of central frequency and bandwidth at output able to multiplex the sub-bands on the outputs of the processor PNT.

In FIG. 5 an exemplary routing performed by a processor PNT as application of an allocation, decided by the radio resource manager RRM, of the frequency resources to the user beams has been represented. According to this example, to the spot or user beam number 1 have been allocated the colours C1 and C2 present on the output 1 of the processor PNT; to spot 2 have been allocated the colours C1, C4 and C5 present on output 2 of the processor PNT. These frequency bands or colours are transmitted as input 1 of the processor PNT by the feeder link between the feeder station SA1 and the satellite SAT. To spot 8 have been allocated the colours C1, C3 and C5 present on output 8 of the processor PNT; these colours are transmitted as input 2 of the processor PNT by the feeder link between the feeder station SA2 and the satellite SAT.

Figure 6:
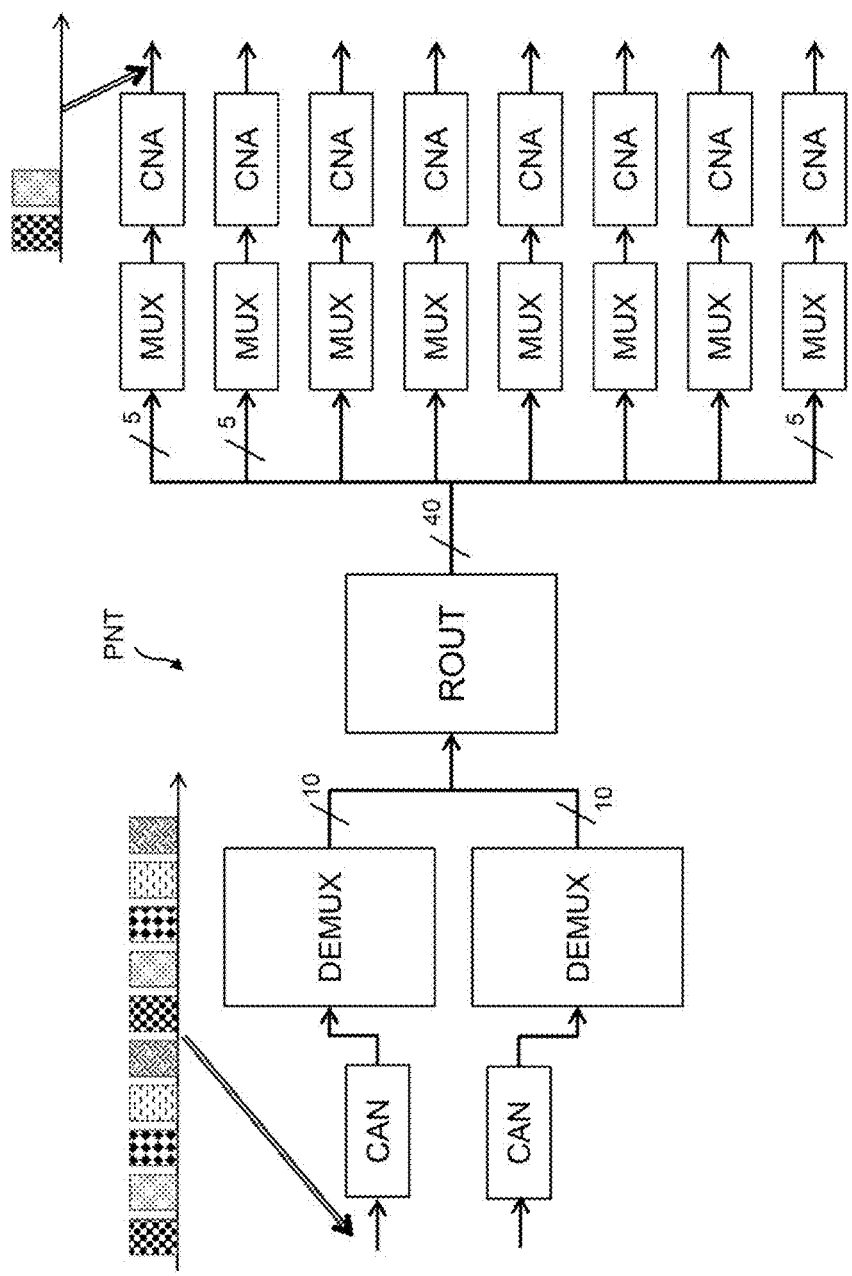
FIG. 6*bis*, a diagram of a second exemplary architecture of a digital transparent processor, FIG. 7, a diagram of an exemplary architecture of a very high throughput satellite system according to the invention, FIG. 8, a flowchart of an exemplary succession of the actions implemented in the establishment of an allocation configuration according to the invention, FIG. 9, a functional diagram of a radio resources manager according to the invention, FIG. 10, a flowchart detailing the steps for implementing the method of allocating radio resources according to the invention, FIG. 11, two examples of antenna radiation patterns in two different spots, FIG. 12, a time/frequency chart illustrating an exemplary allocation of frequency channels to several spots, FIG. 13, a time/frequency chart illustrating an exemplary allocation of frequency channels to various users of various spots, FIG. 14, a flowchart detailing the steps for implementing a variant embodiment of the method of allocation according to the invention.

FIG. 6 represents an exemplary embodiment of a digital transparent processor PNT having two inputs and eight outputs. On each input there is an analogue-digital converter CAN which samples and converts into digital form the radio signal arising from the feeder stations and consisting of a frequency multiplex of 10 sub-bands. This digital signal is intended for a demultiplexer DEMUX with one input and ten outputs whose role is to filter each sub-band, frequency convert it and direct it towards an input of a router ROUT. Each filter is programmable in bandwidth and central frequency. The router ROUT directs each of its twenty inputs towards one of its forty outputs. The outputs of the router ROUT are connected to eight frequency multiplexers MUX with five inputs and an output whose role is to reconstruct a frequency multiplex with at most the five sub-bands present on its five inputs. Each multiplexer MUX is programmable in coherence with the programming of the filters of the demultiplexers DEMUX. A multiplexer MUX is connected at output to a digital-analogue converter CNA which converts the digital signals into radio signals intended for the user spots.

FIG. 6*bis* represents a variant embodiment of the digital transparent processor PNT described in FIG. 6, in which a computational beamforming network FFC is installed between the router ROUT and the multiplexers MUX. In this embodiment, the outputs of the processor PNT correspond to the radiating elements of a multibeam active antenna.

Figure 7:
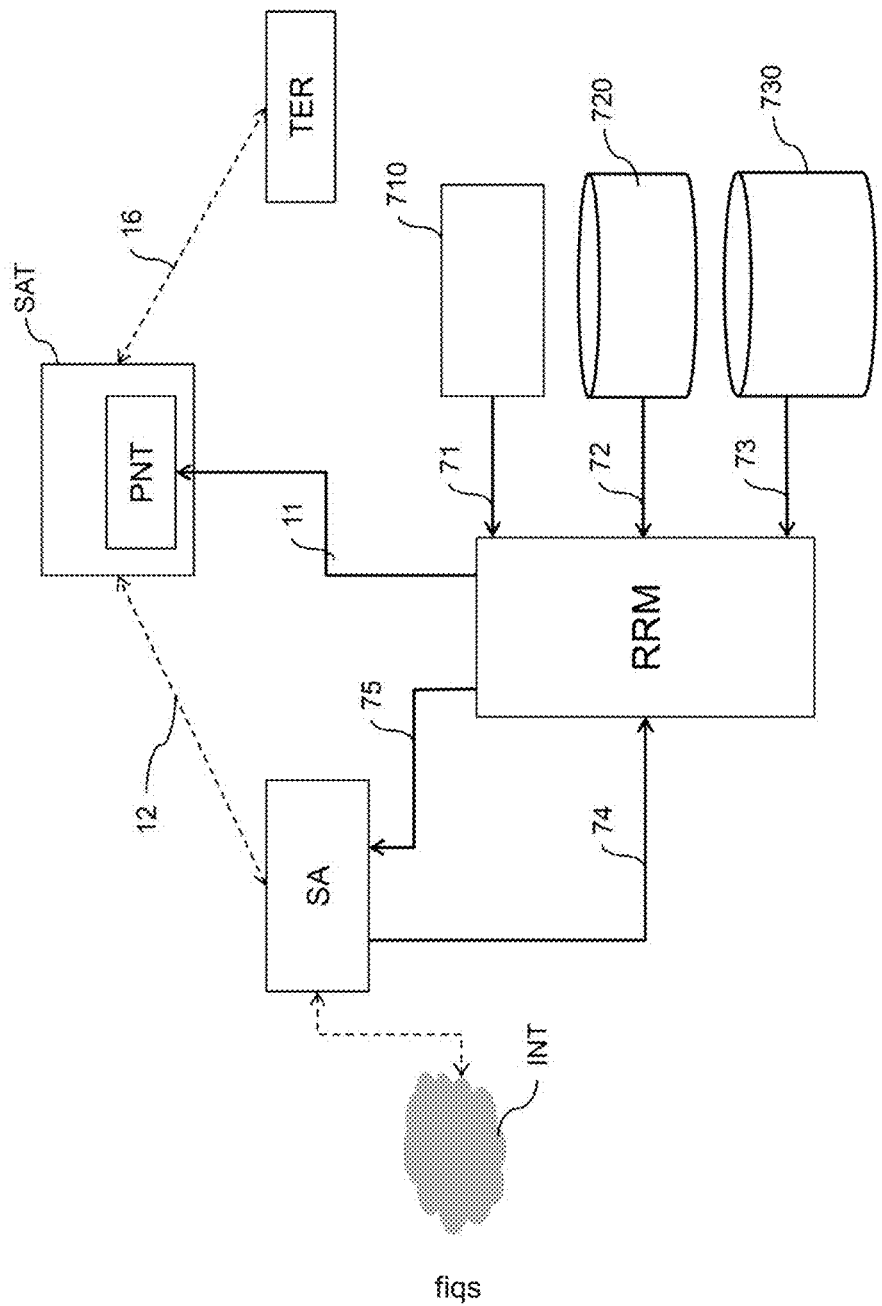

FIG. 7 shows diagrammatically, functionally, an exemplary satellite telecommunications system according to the invention. The system according to the invention implements a particular method of allocating radio resources which is implemented by the radio resources manager RRM. This piece of equipment interacts with a user database 730 which contains information relating to the geographical position of each user terminal, as well as information on the radio characteristics and performances of each user terminal and the quality-of-service level subscribed by each user. All this information is provided to the radio resources manager RRM via a communication channel 73. Moreover, the system also comprises a satellite database 720 which contains the radiation patterns of the antennas of the satellite SAT making it possible to deduce the antenna gains in each direction of pointing. This information is provided to the radio resources manager via a communication channel 72. The system also comprises a weather database 710 which contains information making it possible to determine the level of attenuation of the signal on the user link 16 as a function of the current and forecast meteorological conditions in the various cells illuminated by the antenna beams. This information is provided to the radio resources manager RRM via a communication channel 71. The radio resources manager RRM moreover communicates with the feeder stations SA and the satellite SAT.

Each feeder station SA transmits through a communication channel 74 to the radio resources manager RRM information on the state of the traffic in each of the user spots. This information includes at least for each active link: the identity of the terminal, the quality of service required for the terminal, the signal-to-noise ratio, the atmospheric attenuation, the coding rate used on the link. This information also includes for each link to be established in a next time slot: the identity of the terminal and the quality of service required by the terminal.

The radio resources manager RRM transmits through a communication channel 11, which may be for example the remote control link of the satellite SAT, the configuration to be applied to the radio equipment of the payload CU, especially information intended for programming the digital transparent processor PNT.

The radio resources manager RRM transmits through a communication channel 75, to the feeder stations SA, information on the traffic to be established at the next time slot in each of the user spots and information on the configuration of the satellite resulting from the resources allocation decided by the radio resources manager RRM.

The radio resources manager RRM may or may not be implemented by an embedded processor or by a specific device. The processor may be a generic processor, a specific processor, an application specific integrated circuit (ASIC) or a network of in situ programmable gates (also known by the name FPGA for "Field-Programmable Gate Array"). The radio resources manager RRM can use one or more dedicated electronic circuits or a general-purpose circuit. The technique of the invention can be carried out on a reprogrammable computation machine (a processor or a microcontroller for example) executing a program comprising a sequence of instructions, or on a dedicated computation machine (for example a set of logic gates such as an FPGA or an ASIC, or any other hardware module).

Figure 8:
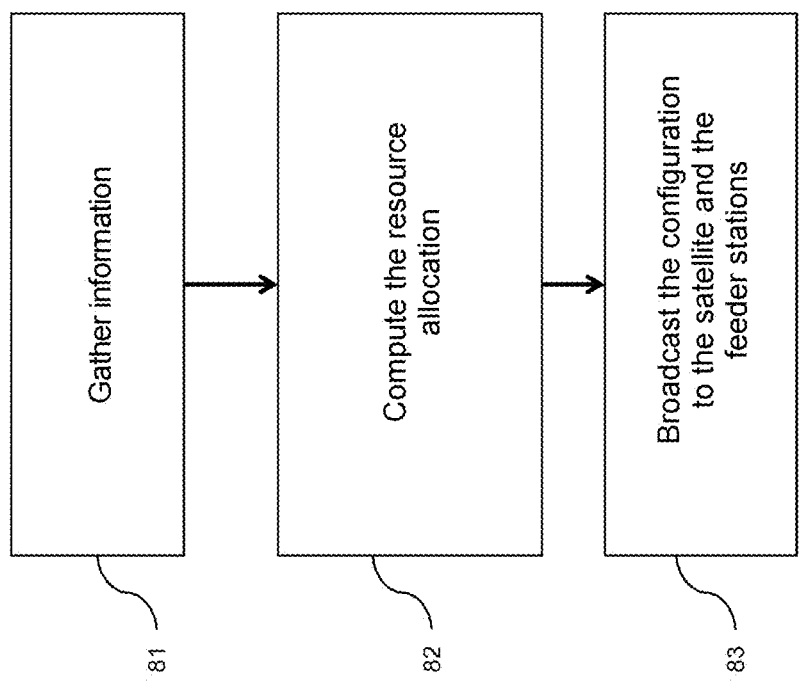

FIG. 8 gives an example of the sequence of steps of the radio resource manager RRM of a satellite-based Internet access system implementing the present invention. The sequence of steps described in FIG. 8 is carried out at the end of each time slot so as to apply a new resource allocation for the following time slot. The first step 81 consists in gathering the data and information necessary for the allocation configuration computations. The second step 82 comprises the computation of the allocation configuration for the next time slot. The following step 83 comprises the broadcasting of the configuration information to the satellite and the feeder stations.

Figure 9:
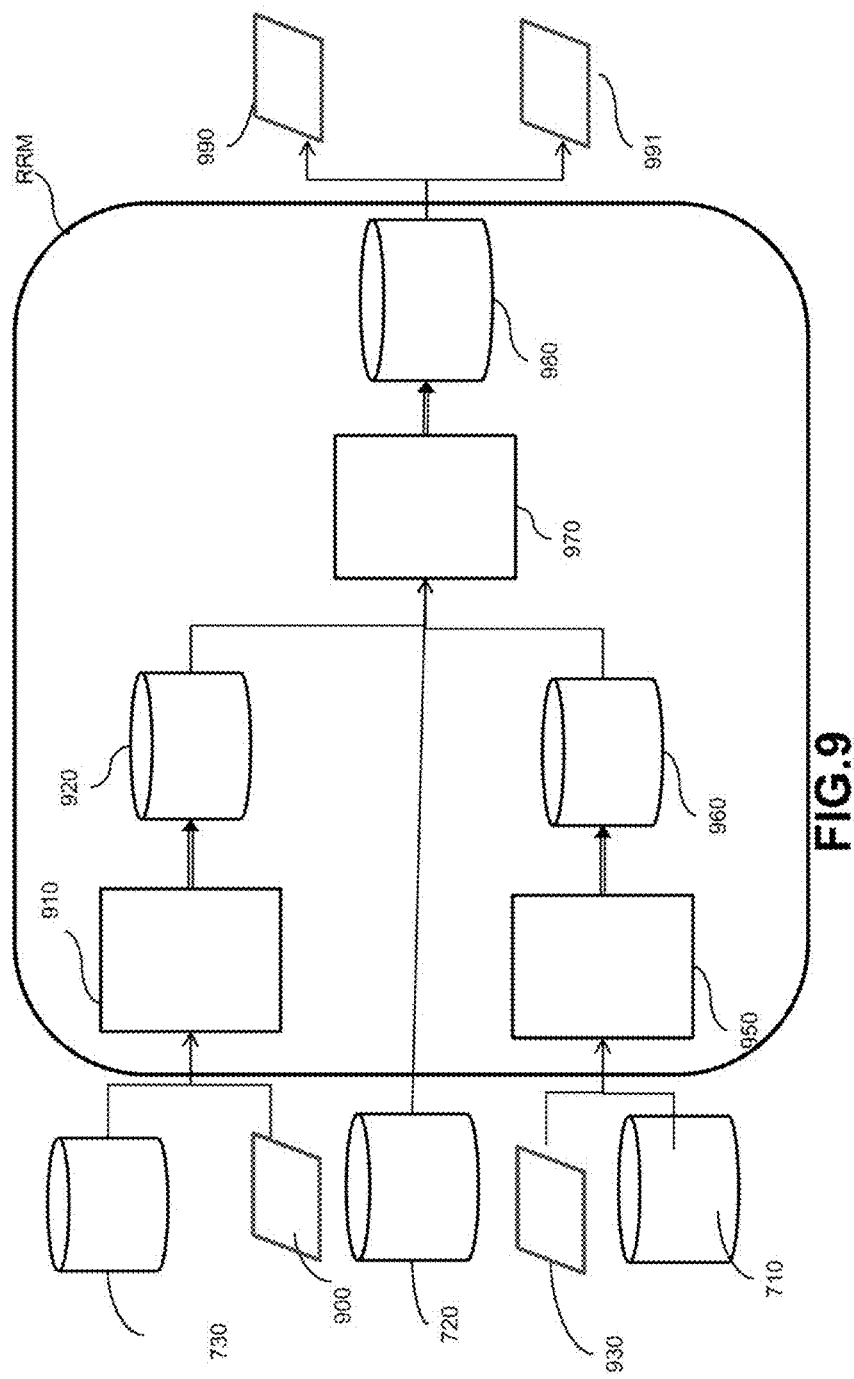

FIG. 9 shows diagrammatically an exemplary radio resources manager RRM according to the invention.

The radio resources manager RRM receives as input the user terminals' characteristics stored in the user database 730, the list 900 of user links active during the previous time slot, a measurement 930 of the signal-to-noise ratios and/or of the modulation and coding rates of the active user links, as well as the weather data, stored in the weather database 710, in the satellite's zone of coverage.

A first computation module 910 is configured to calculate a map of the traffic, that is to say a list of user links to be established as well as their characteristics. This traffic map is stored in a database 920.

A second computation module 950 is configured to estimate the level of atmospheric attenuation or more generally the level of degradations undergone by each user link to be established. These estimations are stored in a database 960.

A third computation module 970 is configured to determine the allocation of radio resources to each user link to be established and to store the resources allocation configuration determined in a database 980. The third computation module receives the data saved in the databases 920 and 960 as well as in the database 720 of the characteristics of the antennas of the satellite.

On the basis of this resources allocation configuration, the traffic 990 in the following time slot is established. Stated otherwise, the list of active links together with their characteristics is established, as is the hardware and software configuration 991 of the satellite SAT and of the feeder stations SA in order to implement this resources allocation configuration.

Figure 10:
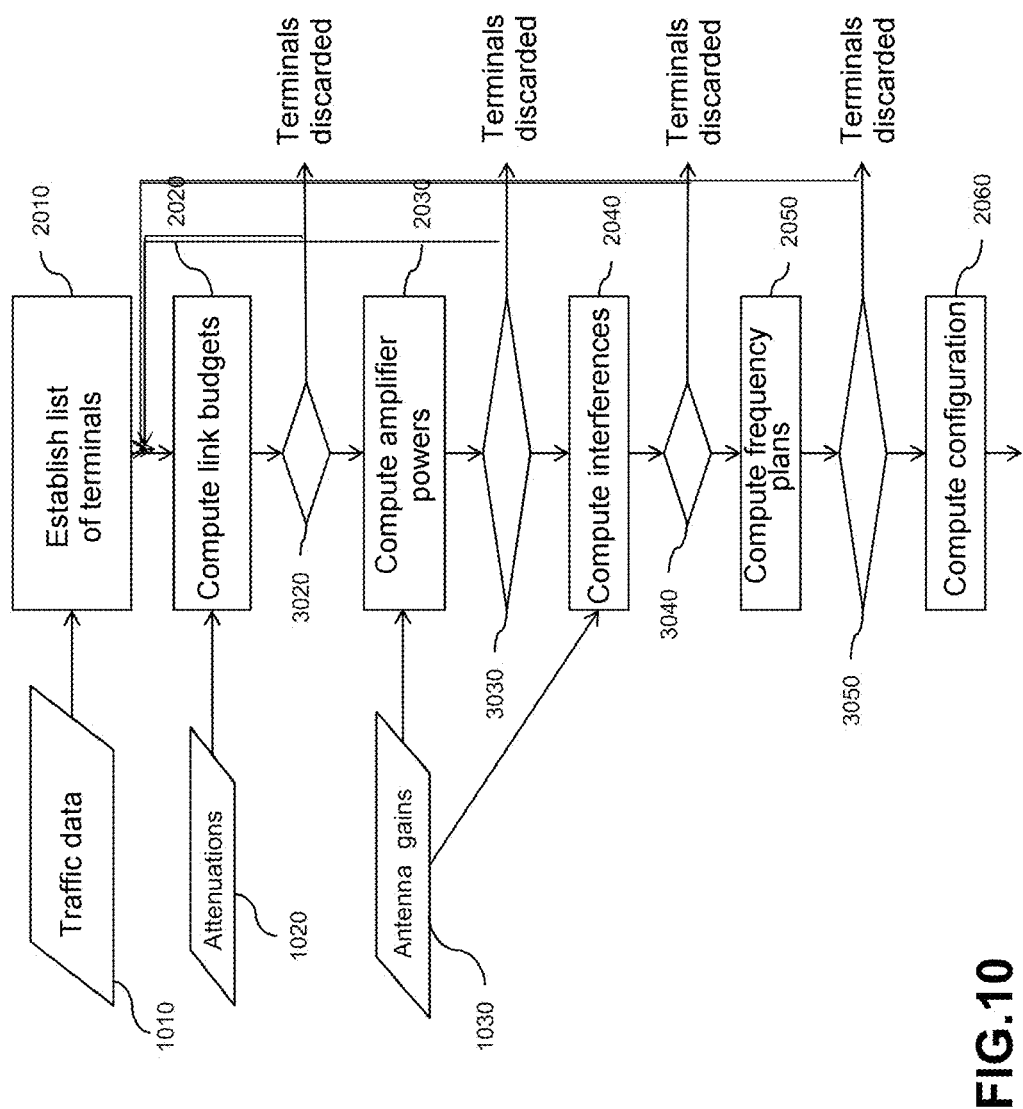

FIG. 10 represents a flowchart detailing the steps for implementing the method of allocating radio resources according to the invention. This method is implemented by a radio resources manager RRM. It relates to the allocation of frequency bands for the forward links from the feeder stations to the user terminals.

An objective of the method according to the invention is to maximize the number of simultaneously active user terminals with the following constraints. A first constraint is to not exceed the total radiofrequency power available in the satellite SAT as well as the maximum radiofrequency power of each multiport amplifier MPA. Another constraint is to not exceed the processing capacity of the digital transparent processor PNT. Another constraint is to not exceed the bandwidth of the feeder links. Another constraint is to establish all the user links with a greater signal-to-noise plus interference ratio than that required to ensure a predetermined quality of service for each link. Thus, a user will be served if the signal-to-noise plus interference ratio produced on the user link is greater than the signal-to-noise ratio required by the quality-of-service level.

The method is executed iteratively for each new time slot allocated to the users in order to communicate.

The first step 2010 of the method of allocating resources consists in establishing a list of the terminals which will be active in the next time slot and in defining the order of allocation on the basis of data 1010 contained in the traffic map stored in the database 920 of FIG. 9. The order of allocation of resources to the terminals may be random, may follow priority criteria or result from a scheduling algorithm such as the weighted round robin algorithm.

The following steps of the method are executed for each terminal of the list established in step 2010, in an order predetermined for example as a function of priorities.

In a second step 2020, a nominal link budget is computed for the current terminal to which one wishes to allocate communication resources. The computation of a link budget comprises the determination of a signal-to-noise ratio $SNR_n$ produced in the absence of interference on the link between a feeder station and the terminal. The inverse of the signal-to-noise ratio $SNR_n$ is equal to the sum of the inverses of a signal-to-noise plus interference ratio $SNIR_s$ produced on the feeder link and in the repeater of the satellite and of a signal-to-noise ratio $SNR_d$ on the downlink from the satellite to the terminal: $SNR_n^{-1} = SNIR_s^{-1} + SNR_d^{-1}$.

The signal-to-noise ratio $SNR_d$ can be computed on the basis of the link budget equation: $SNR_d = EIRP_u \cdot (G/T)_u \cdot L_u \cdot A_u \cdot 1/(k.B)$.

$EIRP_u$ is the Equivalent Isotropic Radiated Power emitted in the direction of the user terminal u by the antenna generating the beam illuminating the spot containing the user terminal u. The value of the power $EIRP_u$ is defined for each class of terminal and of service as a function of the user's needs. It may be for example the EIRP power in clear sky necessary to provide a given service to a class of terminal.

$(G/T)_u$ is the merit factor of the terminal, which is obtained with the help of the database 730, $L_u$ are the propagation losses in free space between the satellite and the terminal, $A_u$ are the attenuations undergone by the signal on the downlink between the satellite and the terminal. The attenuations $A_u$ are contained in a map of the attenuations 1020 and are determined on the basis of meteorological data k is Boltzmann's constant and B the bandwidth of the channel.

The inverse of the signal-to-noise plus interference ratio $SNIR_s$ is the sum of the inverses of the signal-to-noise ratio produced on the feeder link $SNR_a$ and of the signal-to-intermodulations ratio $SIR_m$:: $SNIR_s^{-1} = SNR_a^{-1} + SIR_m^{-1}$. These intermodulations are generated by the multiport amplifiers MPA aboard the satellite. The evaluation of the signal-to-intermodulations ratio $SIR_m$ is done on the basis of the knowledge of the operating point (that is to say the power back-off) of the multiport amplifiers MPA; the operating point is usually accessible through the telemetry of the satellite.

The signal-to-noise ratio $SNR_a$ of the feeder link can be computed on the basis of the link budget equation:
$SNR_a = EIRP_g \cdot (G/T)_{sat} \cdot L_a \cdot A_a \cdot 1/(k.B)$.

$(G/T)_{sat}$ is the merit factor of the satellite in the direction of the feeder station and is known by construction, $L_a$ are the propagation losses in free space between the feeder station and the satellite, $A_a$ are the attenuations undergone by the signal on the uplink between the feeder station and the satellite. The attenuations $A_a$ are contained in a map of the attenuations 1020 or estimated by extrapolation on the basis of measurements of the attenuations, made in the feeder station, on the downgoing feeder link.

$EIRP_g$ is the Equivalent Isotropic Radiated Power emitted in the direction of the satellite by the antenna of the feeder station of the signal intended for the user u. The value of $EIRP_g$ is determined on the basis of the value of $EIRP_u$ by inverting the formula: $EIRP_u = EIRP_g \cdot G_{sat} \cdot L_a \cdot A_a$.

$G_{sat}$ is the gain of the satellite, it is equal to the gain of the antenna of the satellite in the direction of the feeder station, and which is known by construction, multiplied by the gain of the repeater of the satellite which is known through the telemetry of the satellite, multiplied by the gain of the antenna of the satellite in the direction of the user u which is saved in the antenna database 720.

In the following step 3020, the computed signal-to-noise ratio $SNR_n$ is compared with a required signal-to-noise ratio $SNR_r$. If $SNR_n$ is less than $SNR_r$ then the associated terminal is discarded from the list and we go to the following terminal. In the converse case, we continue at step 2030.

In a following step 2030, the radio power necessary is computed, for the multiport amplifier associated with the beam illuminating the spot in which the user terminal is situated, to be able to obtain an equivalent isotropic radiated power $EIRP_u$ which corresponds to that used to compute the signal-to-noise ratio $SNR_d$ on the downlink between the satellite and the terminal. The necessary radio power is computed in particular on the basis of the gain of the antenna 1030 associated with the spot containing the terminal, in the direction of the terminal and on the basis of the equivalent isotropic radiated power $EIRP_u$ which is equal to the product of the radio power and the antenna gain. Optionally the antenna gain can be divided by the losses between the output of the amplifier and the input of the antenna. The gains of the antennas 1030 are contained in the antenna database described in FIG. 9.

The computation of necessary radio power is carried out for all the terminals for which an allocation has already been performed, in the current time slot. The sum of the radio powers of all the amplifiers MPA of the payload of the satellite is computed thereafter.

In a step 3030, the computed sum of the radio powers is compared with a maximum power capacity threshold. If the threshold is exceeded, the current terminal is discarded and it is concluded therefrom that the whole of the power available in the payload is used for the current time slot. We then go to the following time slot.

In the converse case, we go to the following step 2040 which consists in computing a signal-to-interference ratio $SIR_c$ for all the available channels which can be allocated to the terminal.

The signal-to-interference ratio $SIR_c$ is the ratio of the equivalent isotropic radiated power $EIRP_u$ of the antenna beam in the direction of the user terminal in its spot to the sum of the equivalent isotropic radiated powers $EIRP_j$ of the interfering signals emitted in the direction of the user terminal u and corresponding to the other antenna beams associated with the other spots of the coverage. The equivalent isotropic radiated power EIRP being the product of the radio power and the gain of the antenna, the various equivalent isotropic radiated powers $EIRP_j$ are computed on the basis of the radio powers computed in the step 2030 and the antenna gains 1030 arising from the antenna database.

This entails computing the link budgets of all the combinations of allocation of terminals to the channels and choosing in the following step 3040 the combination of terminals/channels allocation which maximizes the number of terminals that can establish a link of the requested quality. That is to say satisfying: $SNR_n^{-1} + SIR_c^{-1} \leq SNR_r^{-1}$.

The computations of the signal-to-interference ratios consider only the interferences in the bandwidth of the channel in the course of analysis, that is to say the interferences related to the other users using this same channel. The interferences due to the users of the adjacent channels are not taken into account in this embodiment of the invention.

The difficulty of this task is in the exponential increase in the number of computations as a function of the number of possible allocation combinations and therefore of the number of terminals and of channels. This is a combinatorial optimization problem. In one embodiment of the invention, the use of a greedy algorithm makes it possible to solve the optimization problem stepwise and to obtain a satisfactory solution. Thus, by following the order of allocation defined in step 2010, for each terminal of the list, the first unused channel of the list of channels is allocated to it. If all the link budgets are complied with $(SNR_n^{-1} + SIR_c^{-1} \leq SNR_r^{-1})$, this channel is allocated to this terminal and we go to the following terminal in the list. In the converse case, one tries to allocate the following channel to this terminal and so on and so forth until the end of the list of channels. If no channel allows an allocation to the terminal, this terminal is discarded from the list.

In a following step 2050, the frequency plans of the feeder links are computed. If the bandwidth of the feeder links does not make it possible to multiplex the number of channels which have been allocated to the terminals, the excess terminals are discarded in step 3050.

Finally, in a last step 2060, the traffic of the following time slot is finalized and the hardware configuration of the satellite and of the feeder stations is computed and will be transmitted through the communication links 75 and 11 of FIG. 7.

Figure 11:
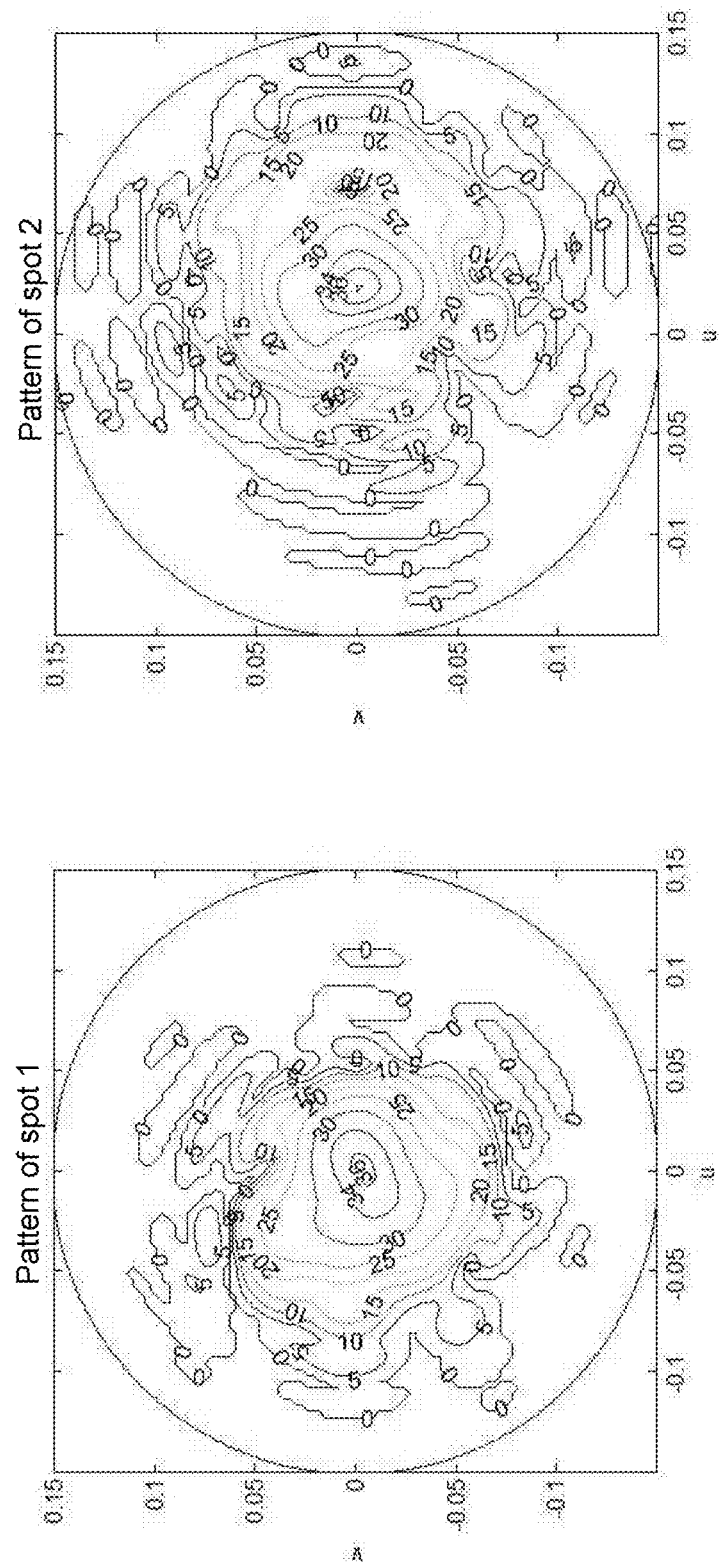

FIG. 11 represents, by way of illustration, two examples of antenna radiation patterns for two different spots.

Figure 12:
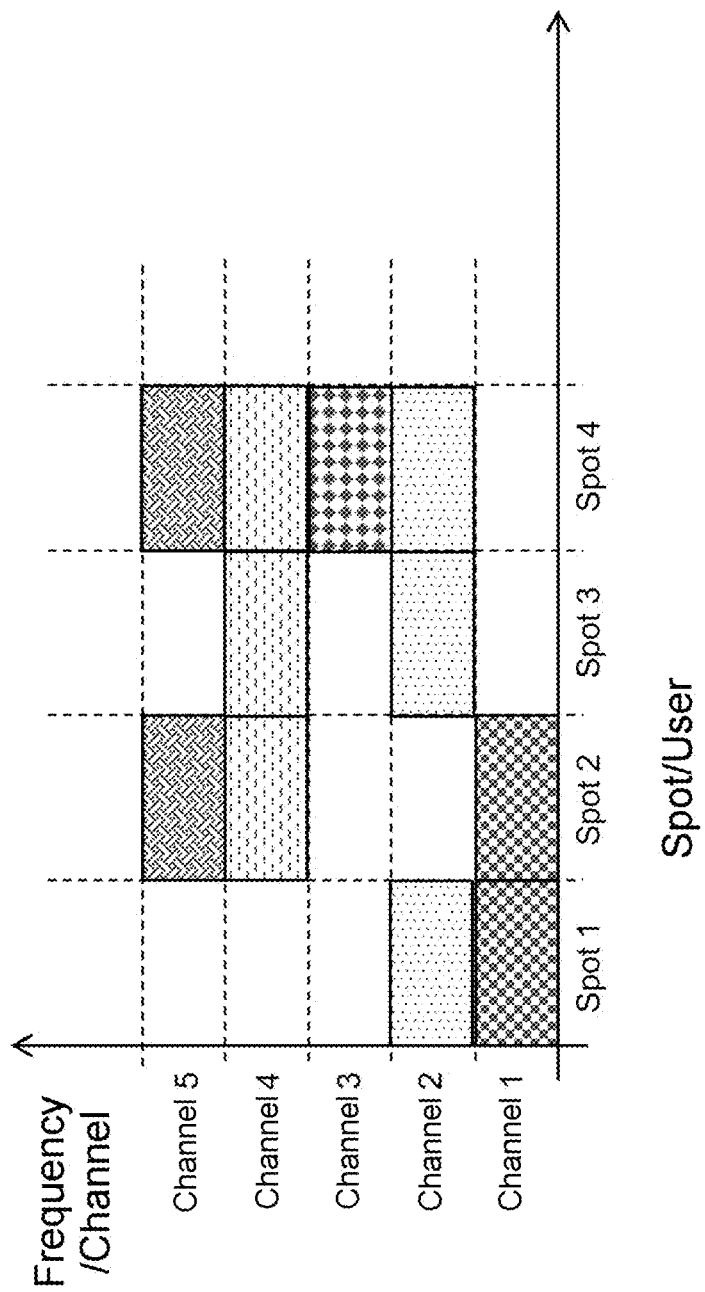

FIG. 12 represents, on a time frequency chart, an exemplary allocation of frequency channels to various spots. In this example, channels 1 and 2 are allocated to certain users of spot 1, channels 2, 4 and 5 are allocated to certain users of spot 2, channels 2 and 4 are allocated to certain users of spot 3, channels 2, 3, 4, 5 are allocated to certain users of spot 4.

FIG. 13 gives an example of the allocation of channels 1 to 5 to the user terminals U1 to U12 according to the method described in FIG. 10. In this example, terminal U1 is the first terminal of the list of terminals requesting a service. This terminal is located in spot 1. Channel 1 is allocated to terminal U1 of spot 1. The following terminal is the terminal U2 located in spot 2, the method of allocation allocates it channel 2. The following terminal U3 is located in spot 2. As first intention, channel 1 is allocated to terminal U3. The computations of the link budgets and in particular the computation of the signal-to-interferers ratios (terminals U1 of spot 1 and U3 of spot 2 interfere mutually) confirms the validity of this allocation. The following terminal U4 is in spot 3. A first trial allocation of channel 1 fails on account of the significant level of the interferers, (here terminals U1 and U3), the second trial allocation of channel 2 succeeds. The application of the method of allocation allows the allocation of channels to the terminals with the exception of the terminal U11 for which no allocation configuration makes it possible to establish a link with the required quality of service.

Figure 14:
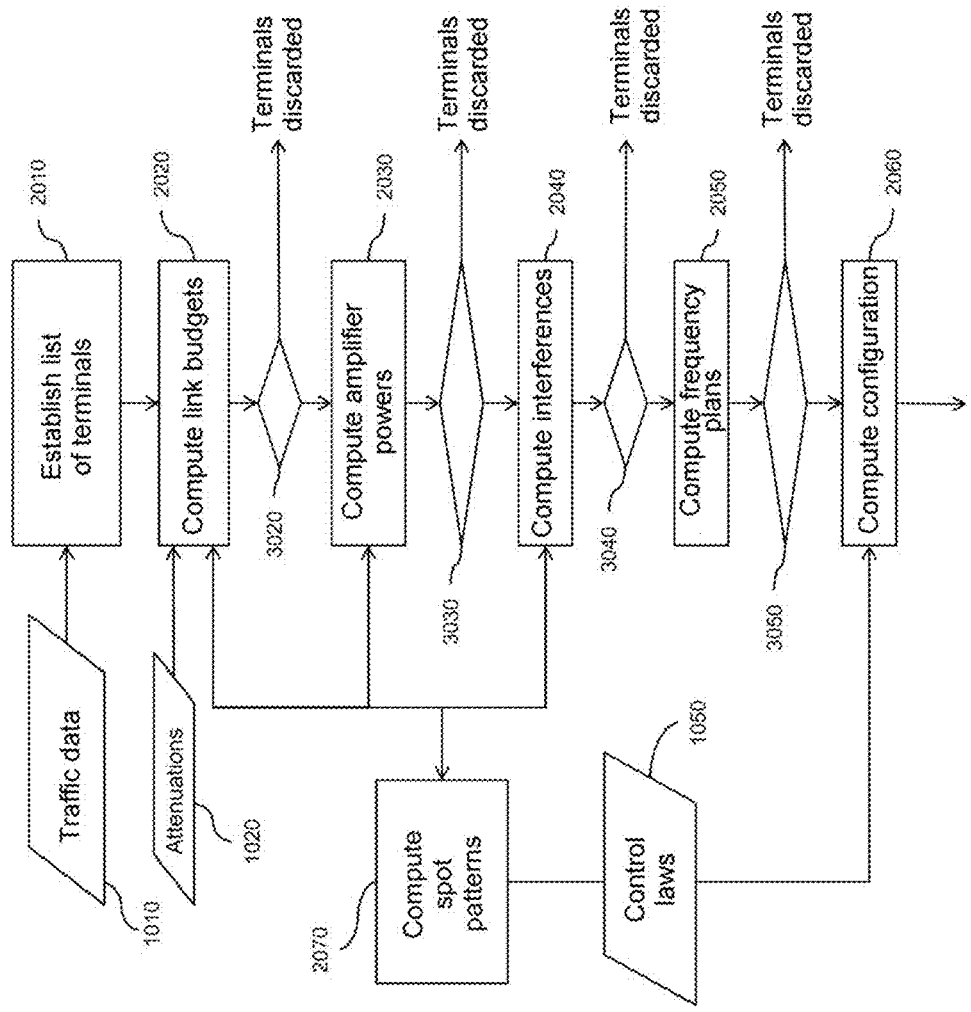

FIG. 14 represents a flowchart of a variant embodiment of the method according to the invention described in FIG. 10. In this variant embodiment, the payload of the satellite is equipped with multibeam active antennas and with a digital transparent processor PNT comprising a computational beamforming FFC network. The system is configured to operate according to a resources access method of SDMA (for Spatial Division Multiple Access) type, that is to say that the system of antennas AMU described in FIG. 3 of the satellite generates a beam in the direction of each active terminal that has established a link. The system of antennas AMU generates a multitude of dynamic beams, whose number, directions of pointing and shapes vary continually as a function of the traffic.

The method of allocation according to the variant described in FIG. 14 comprises the same computation steps as in the case of the fixed spot mode method described in FIG. 10 from step 2010 to step 2060. The difference between the two variants of the invention resides in the fact that the antenna gains necessary for the link budget computations performed in step 2020, the radio power computations performed in step 2030 and the interference level computations performed in step 2040 do not arise from an antenna database but are provided by a step of computing the radiation patterns of the spots 2070. This computing step 2070 synthesizes the dynamic beams pointing at all the terminals of the list, calculates and transmits the gain patterns of these beams in steps 2020, 2030 and 2040 and provides the control laws 1050 intended for the computational beamforming network FFC included in the digital transparent processor PNT. These control laws 1050 enable the active antenna to generate the dynamic beams pointing at the terminals for the next allocation time slot.

Optionally, the gain patterns computed in step 2070 are stored in an antenna database and reused if relevant during another allocation computation.

The invention claimed is:

1. A method of allocating frequency channels, from among a list of channels, to a plurality of terminals in a multi-beam satellite telecommunications system comprising a satellite and at least one feeder station, the satellite comprising at least one amplifier and at least one antenna, the method comprising the steps of:

establishing a list of active terminals and, for each terminal, determining a first signal-to-noise ratio $SNR_n$ for the link between a feeder station and the terminal via the satellite, at least on the basis of an estimate of the attenuation undergone by the signal as a function of the signal propagation conditions, removing the terminal from the list of active terminals if the first signal-to-noise ratio is less than a predetermined threshold, computing the necessary radiofrequency power of the amplifier associated with the beam illuminating the terminal to obtain the said first signal-to-noise ratio, removing the terminal from the list of active terminals if the sum of the necessary radiofrequency powers of all the amplifiers of the satellite exceeds a maximum power capacity threshold; and for each channel selected from the list of frequency channels:
  i. computing a signal-to-interference ratio $SIR_c$ for the said terminal in the selected channel,
  ii. if the sum of the first signal-to-noise ratio $SNR_n$ and of the signal-to-interference ratio $SIR_c$ is less than the said predetermined threshold, allocating the selected channel to the said terminal,
  iii. otherwise, selecting another channel.

2. The method of allocating frequency channels according to claim 1 in which the first signal-to-noise ratio $SNR_n$ is determined on the basis of a signal-to-noise plus interference ratio $SNIR_s$ on a feeder link between a feeder station and the satellite and of a second signal-to-noise ratio $SNR_d$ for the downlink between the satellite and the terminal.

3. The method of allocating frequency channels according to claim 2 in which the second signal-to-noise ratio $SNR_d$ is determined at least on the basis of the equivalent isotropic radiated power $EIRP_u$ emitted by an antenna of the satellite in the direction of the said terminal, of an estimate of the attenuation $A_u$ undergone by the signal as a function of the signal propagation conditions.

4. The method of allocating frequency channels according to claim 1 in which the necessary radiofrequency power of the amplifier associated with the beam illuminating the terminal is determined at least on the basis of a gain of the antenna of the satellite generating the said beam in the direction of the terminal.

5. The method of allocating frequency channels according to claim 4 in which the beams generated by the satellite are fixed and the gains of the antennas of the satellite are precomputed and stored in a database.

6. The method of allocating frequency channels according to claim 4 in which the beams generated by the satellite are reconfigurable and the gains of the antennas of the satellite are determined by a module for computing antenna radiation patterns.

7. The method of allocating frequency channels according to claim 1 in which the necessary radiofrequency powers of all the amplifiers of the satellite are computed for each terminal to which a frequency channel has been allocated.

8. The method of allocating frequency channels according to claim 1 in which the predetermined threshold is a signal-to-noise ratio required to ensure a given quality-of-service level.

9. The method of allocating frequency channels according to claim 1 in which the signal propagation conditions are determined on the basis of meteorological data.

10. The method of allocating frequency channels according to claim 1 in which the steps of the method are iterated while varying at each iteration a time slot allocated to the terminals in order to communicate.

11. A radio resources manager configured to execute a method of allocating frequency channels, from among a list of channels, to a plurality of terminals in a multi-beam satellite telecommunications system comprising a satellite and at least one feeder station, the satellite comprising at least one amplifier and at least one antenna, the method comprising the steps of:

establishing a list of active terminals and, for each terminal, determining a first signal-to-noise ratio $SNR_n$ for the link between a feeder station and the terminal via the satellite, at least on the basis of an estimate of the attenuation undergone by the signal as a function of the signal propagation conditions, removing the terminal from the list of active terminals if the first signal-to-noise ratio is less than a predetermined threshold, computing the necessary radiofrequency power of the amplifier associated with the beam illuminating the terminal to obtain the said first signal-to-noise ratio, removing the terminal from the list of active terminals if the sum of the necessary radiofrequency powers of all the amplifiers of the satellite exceeds a maximum power capacity threshold; and for each channel selected from the list of frequency channels:
  i. computing a signal-to-interference ratio $SIR_c$ for the said terminal in the selected channel,
  ii. if the sum of the first signal-to-noise ratio $SNR_n$ and of the signal-to-interference ratio $SIR_c$ is less than the said predetermined threshold, allocating the selected channel to the said terminal,
  iii. otherwise, selecting another channel.

12. A satellite telecommunications system comprising a multi-beam satellite, at least one feeder station to establish a communication link between a network and a plurality of terminals, via the satellite, and a radio resources manager according to claim 11.

\* \* \* \* \*